United States Patent
Tsukahara et al.

(10) Patent No.: US 9,985,332 B2
(45) Date of Patent: May 29, 2018

(54) WAVEGUIDE COMPRISING SOLID DIELECTRICS SURROUNDED BY AN OUTER CONDUCTOR AND HAVING OUTWARDLY BULGING LONG SIDES

(71) Applicant: MOLEX INCORPORATED, Lisle, IL (US)

(72) Inventors: Takeshi Tsukahara, Yamato (JP); Shigeyuki Hoshikawa, Yamato (JP); Mikiji Tanaka, Yamato (JP); Mio Tanaka, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days. days.

(21) Appl. No.: 15/110,862

(22) PCT Filed: Feb. 2, 2015

(86) PCT No.: PCT/US2015/014092
§ 371 (c)(1),
(2) Date: Jul. 11, 2016

(87) PCT Pub. No.: WO2015/117076
PCT Pub. Date: Aug. 6, 2015

(65) Prior Publication Data
US 2016/0351986 A1    Dec. 1, 2016

(30) Foreign Application Priority Data
Jan. 31, 2014 (JP) .................................. 2014-016464

(51) Int. Cl.
*H01P 3/12* (2006.01)
*H01P 11/00* (2006.01)
*G02B 6/10* (2006.01)
*H01P 3/06* (2006.01)

(52) U.S. Cl.
CPC ................ *H01P 3/122* (2013.01); *G02B 6/10* (2013.01); *H01P 3/06* (2013.01); *H01P 11/001* (2013.01); *H01P 11/005* (2013.01)

(58) Field of Classification Search
CPC .. H01P 3/12; H01P 3/121; H01P 3/122; H01P 11/001; H01P 11/002; H01P 11/006
USPC .................................................. 333/239, 248
See application file for complete search history.

(56) References Cited

U.S. PATENT DOCUMENTS

| 2,761,137 | A | * | 8/1956 | Van Atta et al. | ........ H01P 3/122 333/237 |
| 3,205,462 | A | * | 9/1965 | Meinke | ..................... H01P 3/12 333/239 |
| 4,028,643 | A | | 6/1977 | Itoh | |
| 4,763,981 | A | | 8/1988 | Wilkins | |
| 5,293,443 | A | | 3/1994 | Eoll et al. | |

(Continued)

FOREIGN PATENT DOCUMENTS

JP    54-44113 B    12/1979
JP    03-117001 A    5/1991

(Continued)

*Primary Examiner* — Benny Lee
(74) *Attorney, Agent, or Firm* — James A. O'Malley

(57) ABSTRACT

The waveguide is composed of a solid dielectric, and an outer conductor covering the periphery of the dielectric, the transverse section of the dielectric being rectangular and having a shape bulging outward on the pair of long sides, and the inner surface of the outer conductor adhering closely to the outer surface of the dielectric.

16 Claims, 9 Drawing Sheets

(56) References Cited

U.S. PATENT DOCUMENTS

| | | | |
|---|---|---|---|
| 5,777,260 | A | 7/1998 | Klumps et al. |
| 6,724,283 | B2 * | 4/2004 | Bergstedt et al. ...... H01P 3/121 333/239 |
| 2002/0101309 | A1 | 8/2002 | Chiu et al. |
| 2006/0011376 | A1 | 1/2006 | Van Den Berg et al. |
| 2007/0001789 | A1 | 1/2007 | Suarez-Gartner et al. |

FOREIGN PATENT DOCUMENTS

| | | |
|---|---|---|
| JP | 08-195605 A | 7/1996 |
| JP | 2010-093444 A | 4/2010 |

\* cited by examiner

WAVEGUIDE COMPRISING SOLID DIELECTRICS SURROUNDED BY AN OUTER CONDUCTOR AND HAVING OUTWARDLY BULGING LONG SIDES

REFERENCE TO RELATED APPLICATIONS

The Present Disclosure claims priority to prior-filed Japanese Patent Application No. 2014-016464, entitled "Waveguide," filed on 31 Jan. 2014 with the Japanese Patent Office. The content of the aforementioned Patent Application is incorporated in its entirety herein.

BACKGROUND OF THE PRESENT DISCLOSURE

The Present Disclosure relates, generally, to waveguides, and, more particularly, to waveguides in which the surfaces of a dielectric corresponding to the long sides of a rectangular transverse section bulge outward and the dielectric closely adheres to the outer conductor.

Waveguides have been proposed for transmitting high-frequency waves, such as millimeter waves and microwaves. An example is disclosed in Japanese Patent Application No. [8-195605], the content of which is incorporated in its entirety herein.

FIG. 9 is a perspective view of a conventional waveguide. In this figure, 851 is a dielectric rod made of a flexible polymer and having an oval-shaped cross-section. Also, 861 is metal tape wound around the surface of the dielectric rod 851. This tape is made of thin copper foil with a low resistance. High-frequency waves are guided through the dielectric rod 851 sealed inside.

However, the dielectric rod 851 inside conventional waveguides cannot have a square cross-sectional profile because metal tape 861 is wound around its surface. Therefore, a waveguide with a conventional square cross-sectional profile cannot be provided as a waveguide for microwaves and millimeter waves. Even if metal tape 861 were wound tightly around a dielectric rod 851 with a rectangular cross-sectional profile, small gaps would occur between the tape and the surface of the dielectric rod 851 on the tong sides of the rectangle. When there are gaps between the surface of the dielectric rod 851 and the metal tape 861, transmission loss becomes unstable, and electromagnetic waves in the higher frequency bands cannot be stably transmitted.

SUMMARY OF THE PRESENT DISCLOSURE

In is an object of the Present Disclosure to solve the aforementioned problems associated with conventional waveguides by providing a waveguide in which the surfaces of a dielectric corresponding to the long sides of a rectangular transverse section bulge outward, and the dielectric closely adheres to the outer conductor, thereby stabilizing and reducing transmission loss, simplifying the configuration and manufacturing process, reducing costs, and improving reliability.

The Present Disclosure is a waveguide that is composed of a solid dielectric and an outer conductor covering the periphery of the dielectric, the transverse section of the dielectric being rectangular and having a shape bulging outward on the pair of long sides, and the inner surface of the outer conductor adhering closely to the outer surface of the dielectric.

In another waveguide of the Present Disclosure, the dielectric is a rod-shaped or wire-shaped component continuously manufactured using the extrusion molding method. In another waveguide of the Present Disclosure, the outer conductor is a hollow pipe-shaped component continuously applied to the periphery of the dielectric by forming a film-like conductive sheet into the component.

In another waveguide of the Present Disclosure, the conductive sheet is gradually reshaped in the forming process so as to envelope the dielectric from both sides while the dielectric is advancing, the left and right side edges joining in a linear seam portion extending in the advancing direction of the dielectric and the sheet adhering closely to the periphery of the dielectric to form a hollow pipe-shaped outer conductor. In another waveguide of the Present Disclosure, the dielectric comprises a first dielectric, and a second dielectric laminated on both sides of the first dielectric.

In another waveguide of the Present Disclosure, the refractive index of the first dielectric is greater than the refractive index of the second dielectric. In another waveguide of the Present Disclosure, the dielectric includes an inner conductor embedded in the interior, and the inner conductor has an outer exposed surface corresponding to a long side of the dielectric in transverse section, the outer exposed surface adhering closely to an inner surface of the outer conductor.

The Present Disclosure is able to provide a waveguide in which the surfaces of a dielectric corresponding to the long sides of a rectangular transverse section bulge outward. In this way, the dielectric closely adheres to the outer conductor, and transmission loss is stabilized and reduced. This simplifies the configuration of the waveguide and the manufacturing process, reduces costs, and improves reliability.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIGS. 3A and 3B are a pair of cross-sectional views of comparative examples related to the first embodiment of the Present Disclosure, in which FIG. 3A is a view of a first example and FIG. 3B is a view of a second example;

DETAILED DESCRIPTION OF THE PREFERRED EMBODIMENTS

Figure 1:
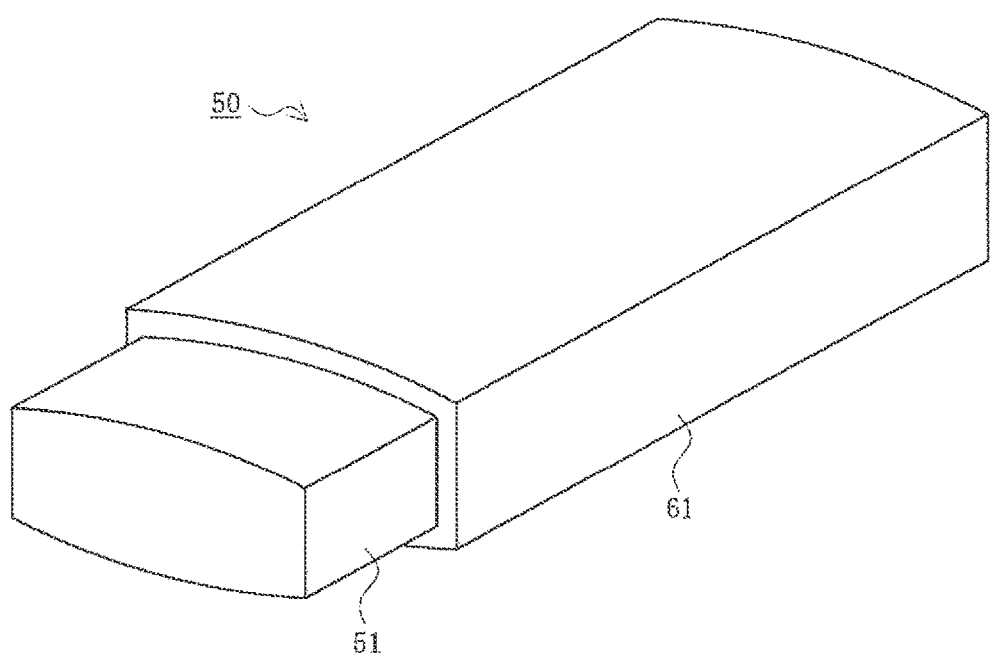
FIG. 1 is a perspective view of a waveguide according to a first embodiment of the Present Disclosure.

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or an aspect are intended to describe a feature or an aspect of an example of the Present Disclosure, and does not imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

FIGS. 1, 2, 3A and 3B illustrate a first embodiment of the Present Disclosure. In these Figures, 50 (FIGS. 1 and 2) is the waveguide of the present embodiment which functions as a transmission route for transmitting electromagnetic waves in the higher frequency bands such as microwaves and millimeter waves. A waveguide 50 is usually a long component. In the example shown in FIG. 1, for the sake of convenience, the length is shortened, and a portion of the outer conductor 61 has been cut off at one end to show the internal structure.

The waveguide 50 is composed of a rod or wire-shaped dielectric 51, and an outer conductor 61 covering the peripheral surface of the dielectric 51. The dielectric 51 may be made of a flexible dielectric material such as a synthetic resin. Examples include fluororesins such as polytetrafluoroethylene, cycloolefin polymer resins, cyclic olefin copolymer resins, polypropylene resins and polyethylene resins. The outer conductor 61 is made of a highly conductive material such as metal. Examples include copper, gold, silver, aluminum and alloys of these elements. The conductive material is used in film or foil form. However, a composite film obtained by laminating a metal foil such as copper foil or gold foil with a polyester film such as polyethylene terephthalate can also be used. Depending on the composition of the materials, the outer surface of the dielectric 51 and the inner surface of the outer conductor 61 adhere to each other chemically or physically.

In the present embodiment, the dielectric 51 is a solid rod or wire-shaped component continuously manufactured using the extrusion method in which the molten dielectric material is extruded from the uniquely shaped opening in a die 71c (FIG. 4) described below to impart a particular cross-sectional profile, and the extruded product is solidified. The outer conductor 61 is the film-shaped flat conductor 62 (FIG. 5) described below which is created using the forming process and then continuously worked into a hollow pipe shape to cover the peripheral surface of the dielectric 51. The inner surface of the outer conductor 61 adheres to the outer surface of the dielectric 51. In the present embodiment, the term "adhering" means adhering substantially, or adhering so that the inner surface of the outer conductor 61 and the outer surface of the dielectric 51 are completely inseparable.

Figure 2:
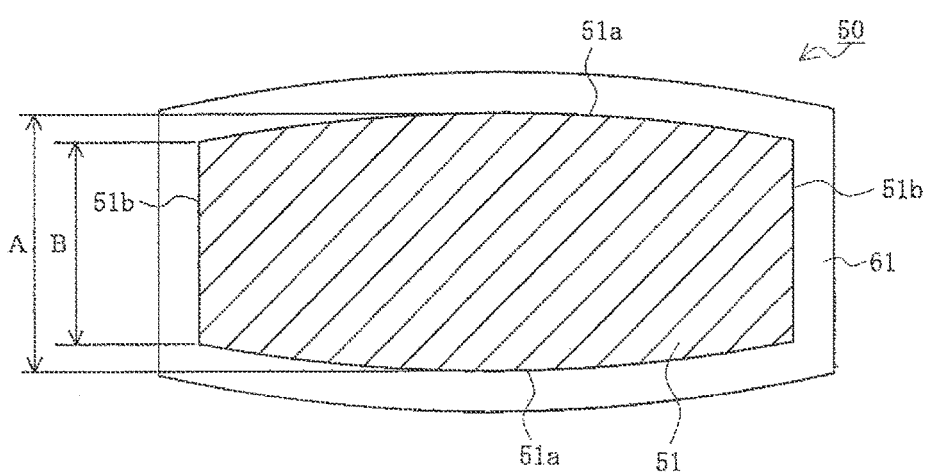
FIG. 2 is a transverse sectional view of the waveguide of FIG. 1.
Figure 3A:
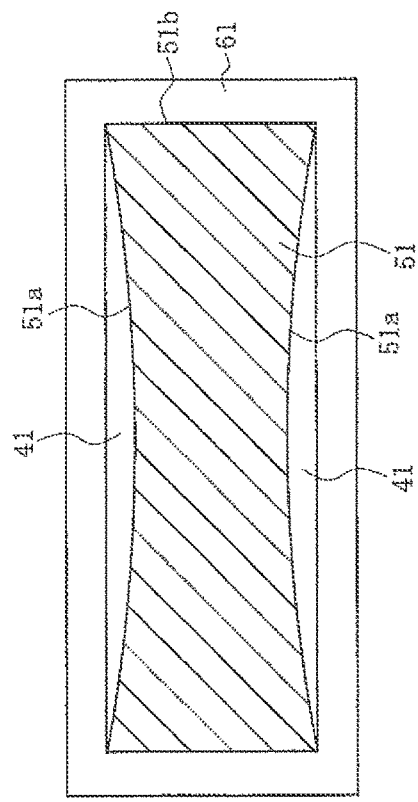
Figure 3B:
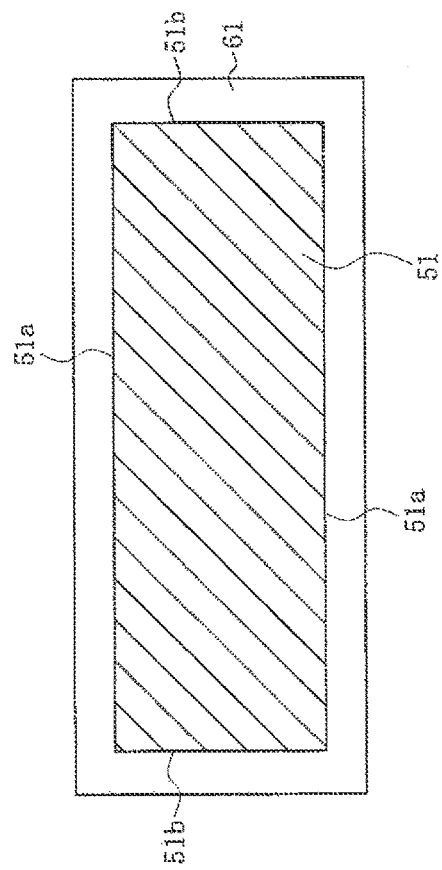

The transverse section of the dielectric 51 is rectangular and ideally has a pair of long sides 51a opposing each other as shown in FIGS. 2, 3A and 3B, a pair of short sides 51b opposing each other, perfectly parallel straight lines forming the pair of long sides 51a, and perfectly parallel straight lines forming the pair of short sides 51b. However, when the dielectric 51 is manufactured using the extrusion molding method, it is difficult to obtain a transverse section that is perfectly rectangular as shown in FIG. 3A. When the opening in the die 71c is perfectly rectangular, there is some so-called pull on the upper and lower surfaces, and recessed surfaces are formed on the long sides 51a which are recessed towards the inside, as shown in FIG. 3B. This creates gaps 41 between these surfaces and the outer conductor 61 surrounding these surfaces which extend in the longitudinal direction (along the long axis of the dielectric 51). Note that the degree of recess in the long sides 51a and the size of the gaps 41 have been exaggerated in FIG. 3B in order to make it clearer.

When gaps 41 occur, the electromagnetic waves experience interference in the gaps 41, transmission loss of electromagnetic waves increases, and stable transmission of electromagnetic waves becomes impossible. When the transverse section of the dielectric 51 is rectangular, the direction of the electric field of the transmitted electromagnetic waves is parallel to the short sides 51b (the vertical direction in FIGS. 3A and 3B). When vertical gaps 41 occur, the electric field is unstable, and transmission loss increases. Even if a dielectric 51 with a perfectly rectangular transverse section could be obtained as shown in FIG. 3A using the extrusion molding method, there would be some bending of the dielectric 51 in the thickness direction (the vertical direction in FIGS. 3A and 3B), and the resulting pull would cause inwardly concave recesses to develop in the long sides 51a corresponding to the outside in the radial direction, and gaps 41 would develop between the long sides and the corresponding outer conductor 61 in the longitudinal direction.

As shown in FIG. 2, while the dielectric 51 of the waveguide 50 in the present embodiment is rectangular with four angles and four sides, its transverse section bulges outward slightly on at least the pair of long sides 51a, Note that the degree of bulging on the long sides 51a in FIG. 2 is exaggerated in order to make it clearer. The degree of bulging on the vertical side surfaces of the dielectric 51 in FIG. 1 is also exaggerated in order to make it clearer. In reality, the transverse section appears to be perfectly rectangular, and the pair of long sides 51a appear to be straight and parallel to each other.

The degree of bulging C of the long sides 51a is defined by the following equation where A is the distance between the farthest points on the pair of long sides 51a, and B is the length of the short sides 51b:

$$C=(A-B)/2B$$

Here, C=0.05 to 0.25, preferably C=0.1 to 0.2, and more preferably C=0.1.

When the dielectric 51 in the present embodiment is manufactured using the extrusion molding process, there is no so-called pull on the vertical surfaces, and the long sides 51a do not become recessed. As a result, it is substantially free of gaps 41 between the long sides and the outer conductor 61 coating the sides in the longitudinal direction, Therefore, the waveguide 50 in the present embodiment can transmit electromagnetic waves stably. When the dielectric 51 and the outer conductor 61 adhere to each other chemically, they become integrated. When they adhere to each other physically, any deformation of the dielectric 51 cause the outer conductor 61 to closely adhere to and rub against the outer surface of the dielectric 51, and the outer conductor 61 remains substantially free of gaps 41. As a result, the waveguide 50 in the present embodiment can stably transmit electromagnetic waves even when it bends. In the present embodiment, the pair of short sides 51b are preferably straight and parallel to each other as shown in FIG. 2.

Figure 4:
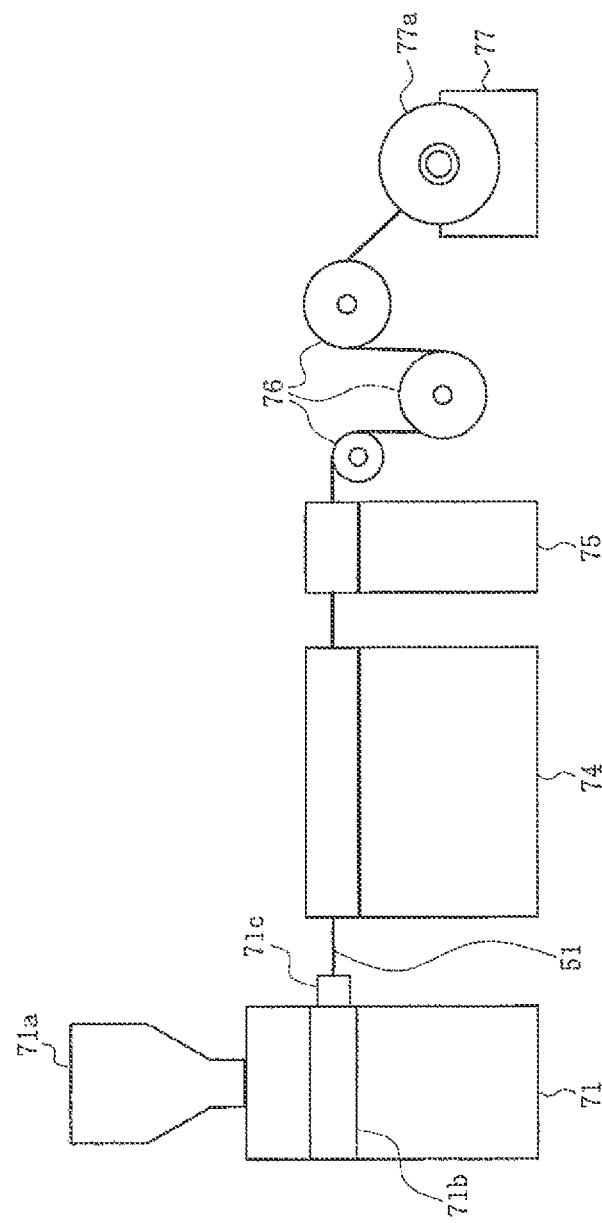
FIG. 4 is a schematic diagram showing a method for manufacturing a dielectric according to the first embodiment of the Present Disclosure.
Figure 5:
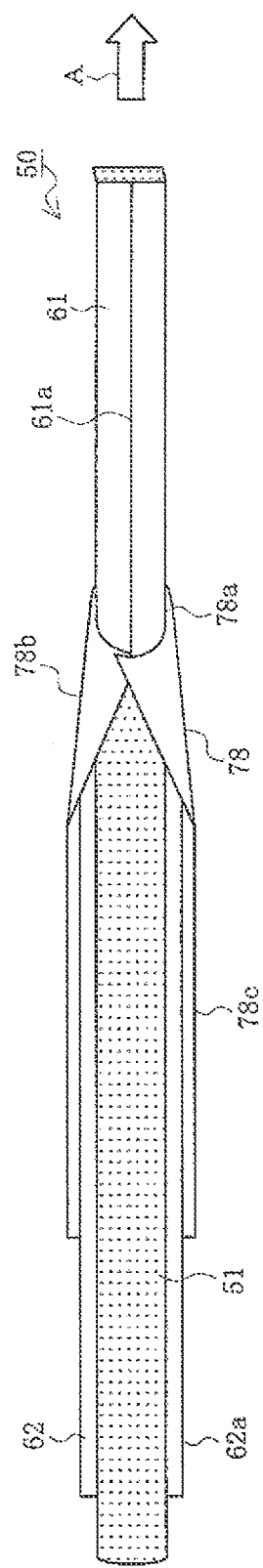
FIG. 5 is a schematic diagram showing a method used to apply an outer conductor to the dielectric according to the first embodiment of the Present Disclosure.

FIGS. 4-5 illustrate a method used to manufacture this waveguide 50. As mentioned above, the dielectric 51 is a long rod or wire-shaped component manufactured using the extrusion molding process and, as shown in FIG. 4, is manufactured using an extruder 71. The extruder 71 includes a hopper 71a receiving the dielectric material used to make the dielectric 51, such as a synthetic resin, a heating cylinder 71b for melting and extruding the dielectric material supplied from the hopper 71a, and a die 71c with a certain shaped opening attached to the outlet from the heating cylinder 71b. The dielectric material in the hopper 71a is usually resin pellets. A rotating screw is installed inside the heating cylinder 71b, and the rotating screw moves the dielectric material through the heating cylinder 71b, melts the dielectric material, and continuously extrudes the molten dielectric material from the outlet. The dielectric material extruded from the outlet of the heating cylinder 71b is passed through the opening in the die 71c to obtain a continuous rod or wire-shaped dielectric 51 with the transverse section shown in FIG. 2. The dielectric 51 extruded from the extruder 71 is cooled and solidified while passing through a water tank 74, is passed through an inspection device 75 to inspect the surface for defects, is transported by a plurality of transport rolls 76, taken up by a winding roll 77a in a winder 77, and stored on the winding roll 77a.

Next, as shown in FIG. 5, the dielectric 51 is covered with an outer conductor 61 using the forming process. The continuous rod or wire-shaped dielectric 51 with the transverse section is discharged from the winding roll 77a (FIG. 4), and transported by a transport device (not shown) in the direction of arrow A. In the figure, 62 is a slender, band-like conductive sheet made of a conductive material. This is the outer conductor 61 before it covers the dielectric 51.

The conductive sheet 62 advances along with the dielectric 51 so that the left and right side edges 62a extend over one surface of the dielectric 51 (preferably over one of the surfaces corresponding to a long side 51a in the transverse section) in the traveling direction of the dielectric 51. When the dielectric 51 passes through the forming jig 78, the conductive sheet 62 is worked by the forming jig 78 so as to envelope the dielectric 51 from both sides. The left and right side edges 62a join along a linear seam portion 61a extending in the longitudinal direction (the traveling direction of the dielectric 51), forming a hollow pipe-shaped outer conductor 61 covering the dielectric 51.

In the example shown in FIG. 5, the forming jig 78 includes a flat guide portion 78c, a die portion 78b formed at the leading end of the guide portion 78c (in the traveling direction of the dielectric 51), and a die hole portion 78a open at the leading end of the die portion 78b. The die portion 78b has a round funnel shape whose inner dimensions become smaller closer to the leading end. The die hole portion 78a has the same outer shape as the waveguide shown in FIG. 2 when viewed from the traveling direction of the dielectric 51. The dimensions of each component are also identical to the outer dimensions of the waveguide 50 shown in FIG. 2. In this way, the conductive sheet 62 advancing along with the dielectric 51 can be guided into the inner surface of the die portion 78b of the forming jig 78, and gradually become a tube enveloping the dielectric 51 from both sides. As the conductive sheet 62 passes through the die hole portion 78a, the left and right side edges 62a are joined along the seam portion 61a and are integrated to form an angular tube-shaped outer conductor 61 closely adhering to the peripheral surface of the dielectric 51 as shown in FIGS. 1-2.

The waveguide 50 obtained in this manner may be taken up again on the winding roll 77a (FIG. 4) for storage, or may be cut into sections of a predetermined length for storage. Here, after storing the manufactured dielectric 51 on the winding roll 77a (FIG. 4), it was fed into the forming process to cover the dielectric 51 with an outer conductor 61. However, the dielectric 51 may be covered with an outer conductor 61 immediately after leaving the forming jig 78 somewhere between the inspection device 75 and the winder 77 shown in FIG. 4.

In the present embodiment, the waveguide 50 has a solid dielectric 51, and an outer conductor 61 covering the dielectric 51. The transverse section of the dielectric 51 is rectangular and has a shape which bulges outward slightly on the pair of long sides 51a. The inner surface of the outer conductor 61 adheres closely to the outer surface of the dielectric 51.

In this way, the dielectric 51 and the outer conductor 61 closely adhere to each other, and transmission loss is stabilized and reduced. The waveguide 50 is easy to manufacture, the configuration of the waveguide 50 is simpler, and costs are reduced. A more reliable waveguide 50 can also be produced.

The dielectric 51 is a rod or wire-shaped component that is continuously manufactured using the extrusion molding process. As a result, a high-quality dielectric 51 can be obtained stably and inexpensively.

The outer conductor 61 is a hollow pipe-shaped component continuously formed by covering the dielectric 51 with a film-like conductive sheet 62 using the forming process. As a result, a high-quality outer conductor 61 can be obtained stably and inexpensively, and the inner surface of the outer conductor 61 is able to adhere closely to the outer surface of the dielectric 51.

In the forming process, the conductive sheet 62 advances along with the dielectric 51, and is gradually deformed so as to envelope the dielectric 51 from both sides. The left and right side edges 62a join at a linear seam portion 61 extending in the traveling direction of the dielectric 51 to form a hollow pipe-shaped outer conductor 61 adhering closely to the peripheral surface of the dielectric 51. In this way, a hollow pipe-shaped outer conductor 61 that adheres closely to the peripheral surface of the dielectric 51 can be obtained easily and inexpensively.

The forming process is not limited to the so-called longitudinal tape wrapping method described above. For example, the so-called overlapping tape wrapping method can be used to wrap the conductive sheet 62 around the dielectric 51. The completed waveguide 50 may also be covered with a protective layer of resin or insulating tape in order to protect the exterior.

Figure 6:
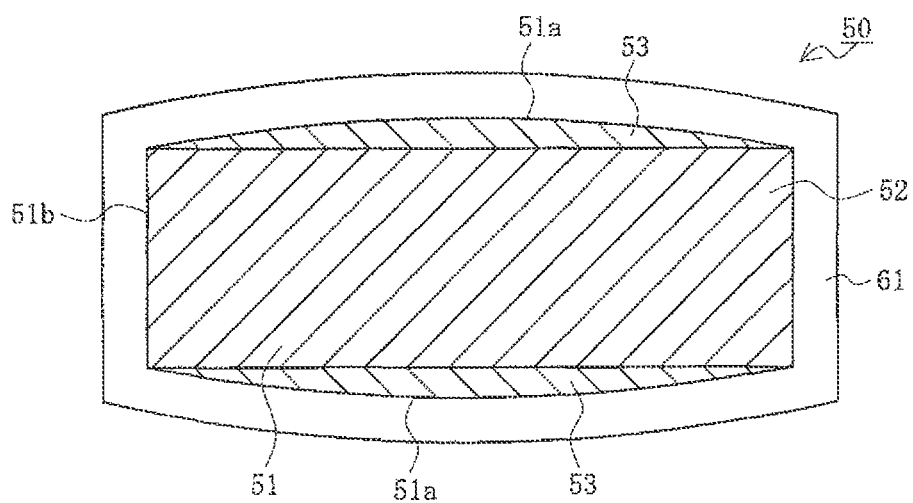
FIG. 6 is a transverse sectional view of a waveguide according to a second embodiment of the Present Disclosure.
Figure 7:
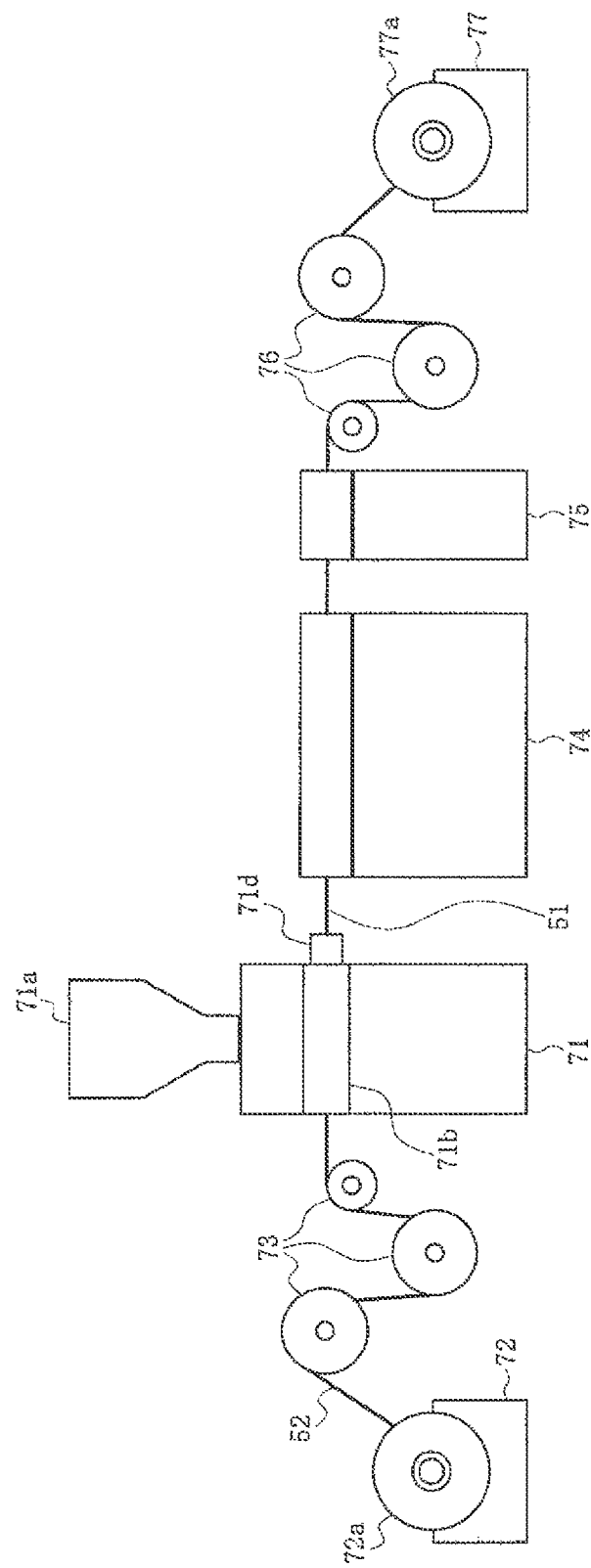
FIG. 7 is a schematic diagram showing a method for manufacturing a dielectric according to the second embodiment of the Present Disclosure.

FIGS. 6-7 illustrate a second embodiment of the Present Disclosure. In FIGS. 6 and 7, the structural elements identical to those in the first embodiment are denoted by the same reference numbers, and further explanation of these elements has been omitted. Also, explanation of operations and effects identical to those of the first embodiment has also been omitted.

The dielectric 51 in the present embodiment, as shown in FIG. 6, includes a solid second dielectric 53 laminated and integrated on both sides of a solid first dielectric 52. By laminating two different types of dielectric, a rectangular dielectric 51 having four angles and four sides but a transverse section bulging outward slightly on at least the pair of long sides 51a can be easily manufactured.

The first dielectric 52 and the second dielectric 53 can be made of different types of dielectric materials. However, the dielectric materials are preferably selected so that the refractive index of the first dielectric 52 is greater than the refractive index of the second dielectric 53. Because the refractive index of the first dielectric 52 on the inside is greater than the refractive index of the second dielectric 53 on the outside, electromagnetic waves can be effectively sealed inside the waveguide 50, and the electric field density can be stabilized. A conductive resin can be selected as the material used in the second dielectric 53, but electromagnetic waves may be absorbed and the resonance phenomenon may occur. Because this effectively increases transmission loss, it is not recommended.

The dielectric 51 in the present embodiment can be manufactured as shown in FIG. 7. First, a continuous rod or wire-shaped first dielectric 52 is manufactured using the device explained in the first embodiment and shown in FIG. 4. Next, a winding roll 72a of the first dielectric 52 is set in the feeder 72 shown in FIG. 7, and the first dielectric 52 is discharged, transported along a plurality of transport rolls 73, and then fed into an extruder 71 fitted with an extrusion head 71d instead of a die 71c. The extrusion head 71d used in the extrusion molding process is one commonly used to integrally form an insulating coating around an electric power cable. The dielectric 51 continuously extruded from the extrusion head 71d includes a laminated second dielectric 53 on both sides as shown in FIG. 6.

Because the other elements of the manufacturing method for the dielectric 51 and the manufacturing method for the waveguide 50 are the same as those in the first embodiment, further explanation of these elements has been omitted. Because the other structural elements of the waveguide 50 in the present embodiment are similar to those in the first embodiment, further explanation has been omitted.

In the present embodiment, the dielectric 51 is composed of a first dielectric 52, and a second dielectric 53 laminated on both sides of the first dielectric 52. In this way, a dielectric 52 can be obtained inexpensively and effectively.

The refractive index of the first dielectric 52 is greater than the refractive index of the second dielectric 53. Therefore, electromagnetic waves can be effectively sealed in the waveguide 50, and the electric field density can be stabilized.

Figure 8:
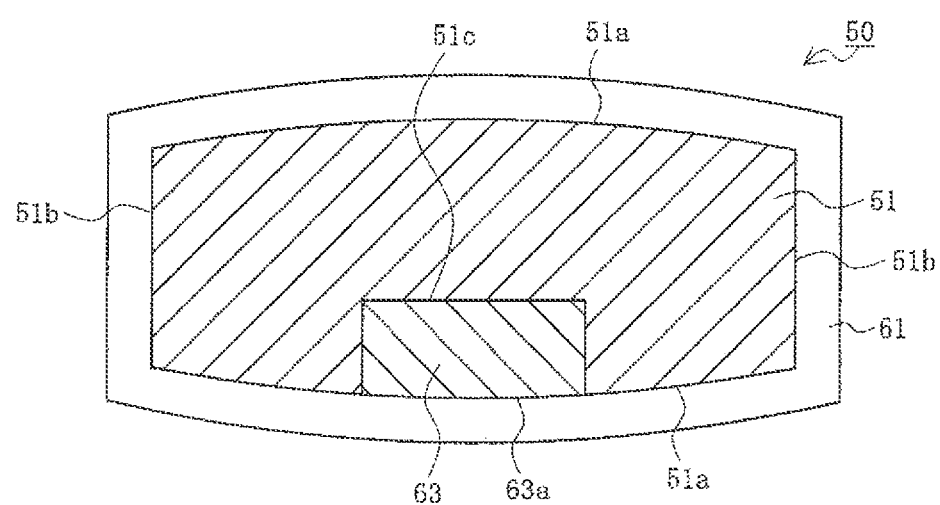
FIG. 8 is a transverse sectional view of a waveguide according to a third embodiment of the Present Disclosure.
Figure 9:
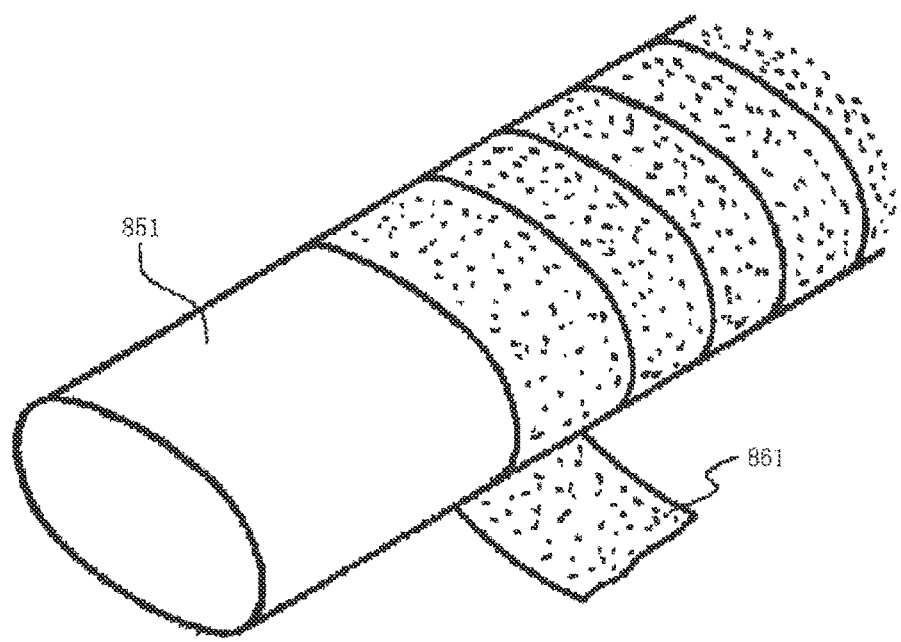
FIG. 9 is a perspective view of a conventional waveguide.

FIG. 8 illustrates a third embodiment of the Present Disclosure. In FIG. 8, the structural elements identical to those in the first and second embodiments are denoted by the same reference numbers, and further explanation of these elements has been omitted. Also, explanation of operations and effects identical to those of the first and second embodiments has also been omitted.

The waveguide 50 in the present embodiment, as shown in FIG. 8, includes an inner conductor 63 arranged inside the dielectric 51. The inner conductor 63 is a solid rod or wire-shaped component having a rectangular transverse section, and the longitudinal direction of the conductor matches the longitudinal direction of the dielectric 51. The inner conductor 63 is embedded inside the dielectric 51 so that one surface is exposed on a long side 51a of transverse section of the dielectric 51 (the bottom in FIG. 8). For this reason, a recessed groove portion 51c is formed inside the dielectric 51 in the longitudinal direction to accommodate the inner conductor 63.

The inner conductor 63 is rectangular with four angles and four sides, but it also has a transverse section that bulges outward slightly on the exposed surface corresponding to one long side 51a of the transverse section of the waveguide 51. The shape of the long side 63a conforms to the shape of the long side 51a in the transverse section of the dielectric Si, Therefore, in the transverse section of the dielectric 51, the long side 51a including the inner conductor 63 (the bottom side in the figure) is symmetrical to the other long side 51a (the top side in the figure). In other words, the sides are mirror images of each other.

The inner conductor 63 may be made of any type of conductive materials, and may be made of the same type of conductive material as the outer conductor 61. In this way, the surface of the inner conductor 63 on the long side 63a closely adheres to the inner surface of the outer conductor 61. The other surface of the inner conductor 63 closely adheres to the dielectric 51. In addition, the outer surface of the dielectric 51 closely adheres to the inner surface of the outer conductor 61.

Because the inner conductor 63 in the waveguide 50 functions as a portion of the outer conductor 61, the waveguide 50 can be said to function like a so-called ridge waveguide. Ridge waveguides are well known in the art (see, e.g., H. Konishi, ed., "Practical Microwave Technologies: Theory and Reality (Part 1)", Nikkan Kogyo Shimbun Publishing, Feb. 21, 2001, pp. 109-111), so an explanation has been omitted. In this way, the propagation distance of the electromagnetic waves in the waveguide 50 can be extended.

In the present embodiment, a dielectric 51 including an inner conductor 63 can be manufactured in the same manner as the second embodiment shown in FIG. 7. First, a rod or wire-shaped inner conductor 63 manufactured beforehand is wound around a feeder roller 72a and set in the feeder 72 as shown in FIG. 7. Then, the inner conductor 63 is discharged from the feeder 72, transported along a plurality of transport rolls 73, and then fed into an extruder 71 fitted with an extrusion head 71d instead of a die 71c. As in the case of the extrusion head 71d explained in the second embodiment, the extrusion head 71d used in the extrusion molding process is one commonly used to integrally form an insulating coating around an electric power cable. Only the interior shape has been changed. The dielectric 51 continuously extruded from the extrusion head 71d includes an embedded inner conductor 63 as shown in FIG. 8.

Because the rest of the manufacturing process for the dielectric 51 in the present embodiment is identical to the manufacturing process for the waveguide 50 in the first and second embodiments, further explanation of the manufacturing process has been omitted. Because the rest of the waveguide 50 in the present embodiment is identical to the configuration explained in the first and second embodiments, further explanation of the configuration has been omitted.

In the present embodiment, the dielectric Si includes an embedded inner conductor 63, and the inner conductor 63 has an exposed outer surface on a long side 51a of the dielectric 51 in the transverse section which adheres closely to the inner surface of the outer conductor 61. In this way, the inner conductor 63 can function as a portion of the outer waveguide 61, and the waveguide 50 can function as a ridge waveguide.

While a preferred embodiment of the Present Disclosure is shown and described, it is envisioned that those skilled in the art may devise various modifications without departing from the spirit and scope of the foregoing Description and the appended claims.

What is claimed is:

1. A waveguide, the waveguide comprising:
   a solid dielectric comprising first and second dielectrics, the second dielectric being laminated on opposite sides of the first dielectric; and
   an outer conductor covering a periphery of the solid dielectric,
   wherein:
      a transverse section of the solid dielectric is rectangular such that the solid dielectric has a pair of long sides and a pair of short sides, the solid dielectric having a shape bulging outward on the pair of long sides; and
      an inner surface of the outer conductor adhering closely to an outer surface of the solid dielectric.

2. The waveguide of claim 1, wherein the first dielectric is a rod-shaped or wire-shaped component continuously manufactured using an extrusion molding method.

3. The waveguide of claim 1, wherein the first dielectric has a refractive index that is greater than a refractive index of the second dielectric.

4. The waveguide of claim 1, wherein the first dielectric is formed of a first type of dielectric material, and wherein the second dielectric is formed of a second type of dielectric material.

5. The waveguide of claim 1, wherein the outer conductor is a hollow pipe-shaped component continuously formed by applying a film-like conductive sheet to the periphery of the solid dielectric.

6. The waveguide of claim 5, wherein the film-like conductive sheet has first and second opposite side edges, and wherein, when the film-like conductive sheet is applied to the periphery of the solid dielectric, the film-like conductive sheet is gradually re-shaped to envelop the solid dielectric, with the first and second opposite side edges joining in a linear seam portion.

7. A waveguide, the waveguide comprising:
   a solid dielectric; and
   an outer conductor covering a periphery of the solid dielectric, wherein the outer conductor is a hollow pipe-shaped component continuously formed by applying a film-like conductive sheet to the periphery of the solid dielectric, wherein the film-like conductive sheet has first and second opposite side edges, and wherein, when the film-like conductive sheet is applied to the periphery of the solid dielectric, the film-like conductive sheet is gradually reshaped to envelop the solid dielectric, with the first and second opposite side edges joining in a linear seam portion;
   wherein:
      a transverse section of the solid dielectric is rectangular such that the solid dielectric has a pair of long sides and a pair of short sides, the solid dielectric having a shape bulging outward on the pair of long sides; and
      an inner surface of the outer conductor adhering closely to an outer surface of the solid dielectric.

8. The waveguide of claim 7, wherein the solid dielectric is a rod-shaped or wire-shaped component continuously manufactured using an extrusion molding method.

9. A waveguide, the waveguide comprising:
   a solid dielectric having a transverse section that is rectangular such that the solid dielectric has an outer surface defined by first and second long sides and first and second short sides, the solid dielectric having a shape bulging outward on the first and second long sides, the solid dielectric defining a recessed groove portion that extends in a longitudinal direction, the recessed groove portion defining an opening along the first long side;
   an inner conductor which is accommodated within the recessed groove portion, the inner conductor having a transverse section which defines a long side of the inner conductor, the inner conductor having a shape bulging outward on the long side such that a shape of the long side of the inner conductor conforms to a shape of the first long side of the solid dielectric and such that an outer surface of the inner conductor defined by the long side thereof is exposed; and
   an outer conductor, the outer conductor covers the outer surface of the solid dielectric and the exposed outer surface of the inner conductor such that an inner surface of the outer conductor adheres closely to the outer surface of the solid dielectric and the exposed outer surface of the inner conductor.

10. The waveguide of claim 9, wherein the inner conductor is formed of a first type of conductive material and the outer conductor is formed of a second type of conductive material.

11. The waveguide of claim 9, wherein the inner and outer conductors are formed of the same type of conductive material, and wherein the inner conductor is accommodated within the recessed groove portion of the solid dielectric before the outer conductor covers the outer surface of the solid dielectric and the exposed outer surface of the inner conductor.

12. The waveguide of claim 9, wherein the solid dielectric has first and second opposite ends, the recessed groove portion extending longitudinally along the first long side from the first end of the dielectric to the second end of the solid dielectric.

13. The waveguide of claim 9, wherein the outer conductor is a hollow pipe-shaped component continuously formed by applying a film-like conductive sheet to the outer surface of the solid dielectric and the exposed outer surface of the inner conductor.

14. The waveguide of claim 13, wherein the film-like conductive sheet has first and second opposite side edges, and wherein, when the film-like conductive sheet is applied to the outer surface of the solid dielectric and the exposed outer surface of the inner conductor, the film-like conductive sheet is gradually re-shaped to envelop the solid dielectric and the inner conductor, with the first and second opposite side edges joining in a linear seam portion.

15. The waveguide of claim 9, wherein the inner conductor is a rod-shaped or wire-shaped component continuously manufactured using an extrusion molding method.

16. The waveguide of claim 9, wherein the solid dielectric is a rod-shaped or wire-shaped component continuously manufactured using an extrusion molding method.

* * * * *